US006388559B1

(12) United States Patent
Cohen

(10) Patent No.: US 6,388,559 B1
(45) Date of Patent: May 14, 2002

(54) REMOTE CONTROL DEVICE AND A METHOD OF USING THE SAME

(75) Inventor: Alan Ian Cohen, Allentown, PA (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/218,188

(22) Filed: Dec. 22, 1998

(51) Int. Cl.[7] .................................................. H04Q 1/00

(52) U.S. Cl. ...................... 340/5.71; 340/3.32; 340/5.7; 340/686.1; 340/539; 318/283; 49/25

(58) Field of Search ................................ 340/5.7, 5.71, 340/5.72, 825.69, 825.72, 3.32, 686.1, 573.1, 539; 318/283; 49/25, 30

(56) References Cited

U.S. PATENT DOCUMENTS 4,035,702 A 7/1977 Pettersen et al.
4,364,003 A 12/1982 Phipps
4,463,292 A 7/1984 Englemann
4,939,434 A 7/1990 Elson
5,027,553 A 7/1991 Vergara
5,226,257 A 7/1993 Moss
5,247,232 A * 9/1993 Lin ............................ 318/283
5,510,686 A 4/1996 Collier
5,661,459 A * 8/1997 Belcher ..................... 340/5.71
5,689,236 A * 11/1997 Kister ..................... 340/686.1
5,752,343 A 5/1998 Quintus
5,790,034 A 8/1998 Khoury
5,883,579 A * 3/1999 Schreiner ................. 340/686.1
5,990,828 A * 11/1999 King ............................. 49/29
6,002,332 A * 12/1999 King ...................... 340/573.1
6,046,562 A * 4/2000 Emil ............................. 49/29
6,084,367 A * 7/2000 Landert ...................... 318/283
6,166,634 A * 12/2000 Dean ....................... 340/686.1
6,255,957 B1 * 7/2001 Sonderegger ............ 340/686.1

* cited by examiner

*Primary Examiner*—Brian Zimmerman
(74) *Attorney, Agent, or Firm*—Duane Morris & Heckscher LLP; Steven E. Koffs

(57) ABSTRACT

A remote control system uses a state signal that indicates whether a door or lock is opening, open, closing or closed. The state signal that indicates whether a door or lock is opening, open, closing or closed is transmitted. The remote control device receives the state signal, while the remote control device is proximate to the door or lock. The received state signal is stored in the remote control device. An alarm signal is generated, if the state signal is not received by the remote control device, and the stored state signal indicates that the door or lock is opening or open. The system may be used to monitor and control an automatic garage door opener, a power door locking system in an automobile, a trunk locking system in an automobile, or door or window locking systems in a building.

36 Claims, 6 Drawing Sheets

REMOTE CONTROL DEVICE AND A METHOD OF USING THE SAME

FIELD OF THE INVENTION

The present invention is related to the field of remote control devices.

DESCRIPTION OF THE RELATED ART

Remotely controlled door opening and closing systems and door locking systems are known. U.S. Pat. No. 4,463,292 to Engelmann, U.S. Pat. No. 5,027,553 to Vergara, and U.S. Pat. No. 5,510,686 to Collier are incorporated by reference herein in their entireties for their teachings on remotely controlled door opening/closing systems; U.S. Pat. No. 5,790,034 to Khoury is incorporated by reference herein in its entirety for its teachings on remotely controlled door locking systems.

People commonly drive away from their homes, unable to recall whether they closed or locked their door or garage door. As a result, they must either go back home to check the doors and locks, or risk theft and vandalism.

Improved systems are desired to provide better security.

SUMMARY OF THE INVENTION

The present invention is a remote control system and a method of using the system, using a state signal that indicates whether a door or lock is opening, open, closing or closed. The state signal (indicating whether a door or lock is opening, open, closing or closed) is transmitted. The remote control device receives the state signal, while the remote control device is proximate to the door or lock. The received state signal is stored in the remote control device. An alarm signal is generated if the state signal is not being received by the remote control device, and the stored state signal indicates that the door or lock is opening or open.

DETAILED DESCRIPTION

The present invention is a monitor and control system that may be used to control an opening/closing system for a door, such as a garage door. The system and method may also be used in a locking system for a door or window of a building, power door locks, or an automated trunk lock. Although the description of the first example applies to a garage door opening system, the control circuit may be used to provide control signals for an automatic door lock, window lock or trunk lock control system.

Figure 1:
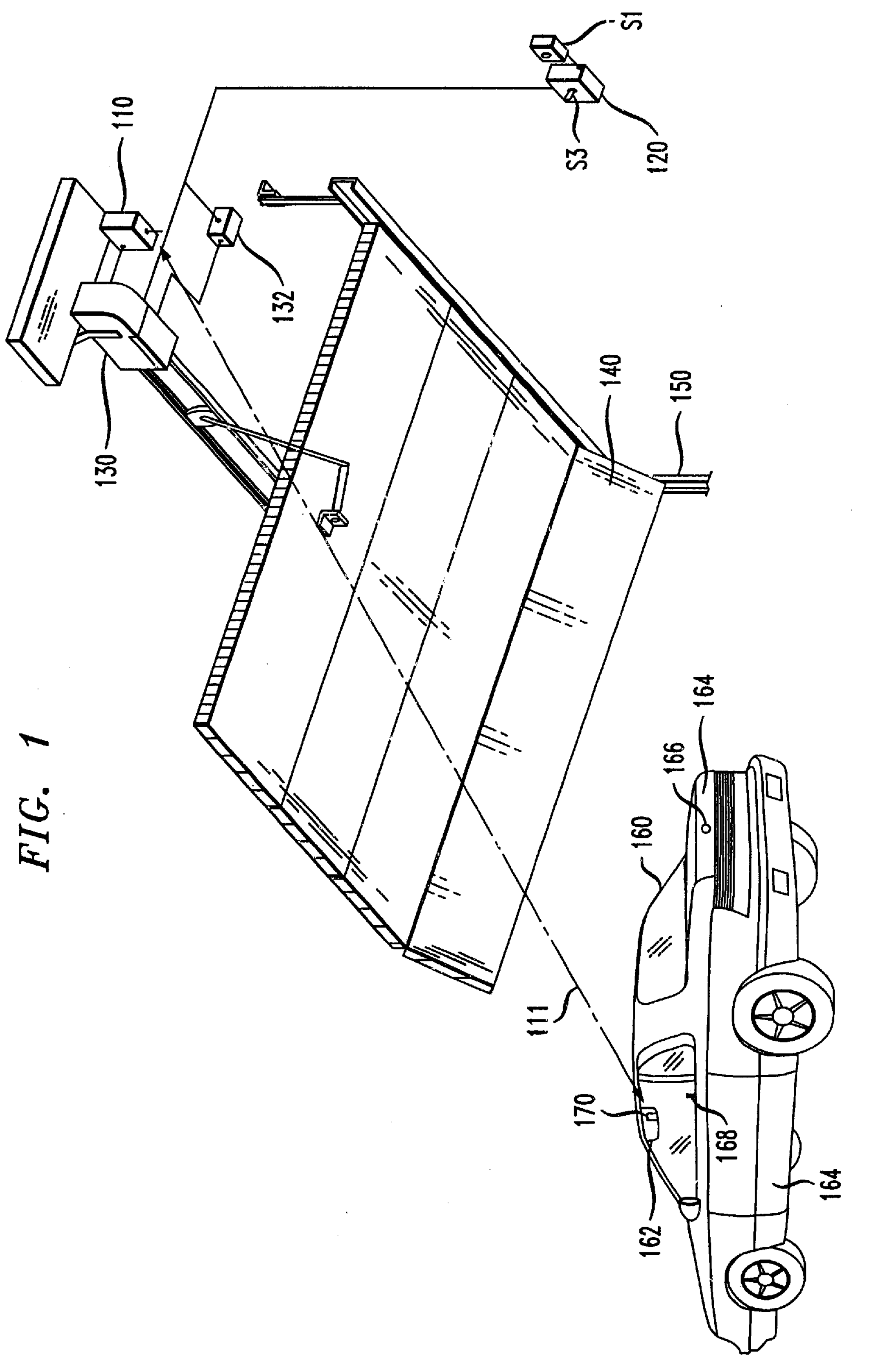
FIG. 1 is a diagram showing an exemplary remote control system according to the invention in a garage door opening and closing system.

FIG. 1 shows a first exemplary remote control apparatus according to the invention. The apparatus includes a control circuit 110, that is capable of transmitting a state signal 111. State signal 111 indicates whether a door 140, which may be a garage door, is opening, open, closing or closed.

One of ordinary skill recognizes that conventional door closers have controls that allow the user to adjust the height of the door at the "closed" position and at the "open position." For example, the "door closed" position may be set so that the door is always at least 2.0 millimeters above the floor of the garage when closed. For purpose of this description, the door is considered closed when it reaches the user defined "closed position," and no further closing movement is required of the door closing drive mechanism. The door is considered open when it reaches the user defined "open position," and no further opening movement is required of the drive mechanism.

The garage door 140 has a conventional door opening and closing system 130. The door opening system 130 has a power source 132, and may have conventional manual controls S1 and S3 for operating the door. A remote control device 170 for operating the control circuit 110 may be carried by the driver or stored in the car 160. For example, the device may be clipped to a visor 162 or attached to another surface in the car 160 with hook and loop or other type fasteners. Alternatively, the remote control device 170 may be integrated within the car's electronic system (not shown in the drawings).

Figure 2:
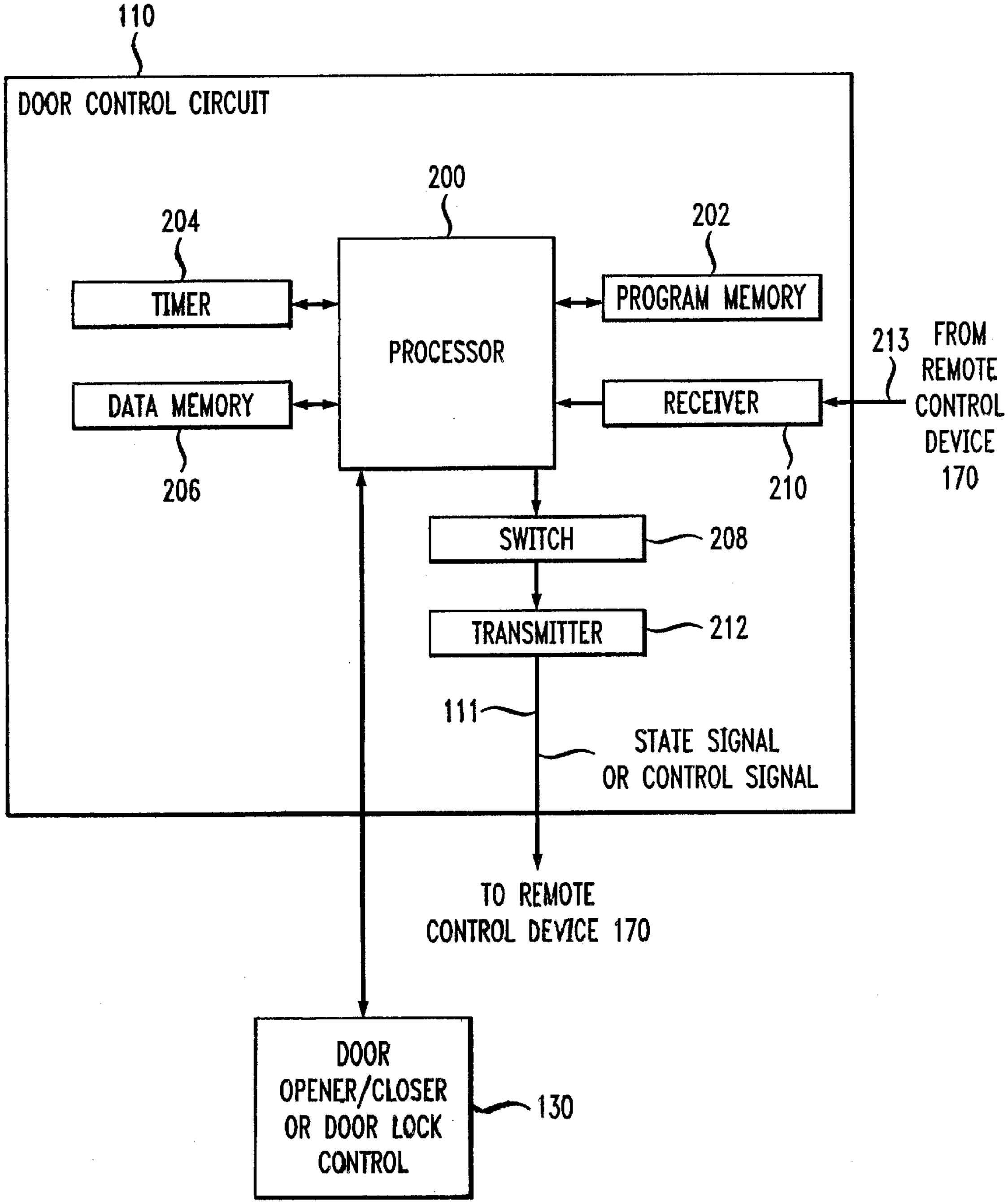
FIG. 2 is a block diagram of the door control circuit shown in FIG. 1.

FIG. 2 is a block diagram of an exemplary control circuit 110 according to the invention. Control circuit 110 has a processor 200 which may be a conventional microprocessor or microcontroller. The control circuit 110 has a program memory 202 for storing program instructions and constant data values. The program memory may be any conventional non-volatile memory device, such as a programmable read only memory (PROM) or the like. The control circuit 110 may store the value of the state signal 111 in the data memory 206. A wireless transmitter 212 transmits the state signal 111 to the remote control device 170. A wireless receiver 210 receives command, control and status signals from the remote control device 170.

The exemplary control circuit 110 includes an optional automatic door (or lock) closing function. Control circuit 110 is programmed to monitor whether the state signal 111 is acknowledged by the remote control device 170. Control circuit 110 may be set to generate and transmit a closing signal to the door closer 130, if the receiver 210 of the control circuit 110 does not receive an acknowledgment signal from remote control device 170, and the state signal 111 indicates that the door (or lock) 140 is open. The automatic door closing feature may be shut off manually, if the user intends to keep the garage door open for an extended period.

The exemplary control circuit 110 may also include a timer 204 that is started when the door 140 (or lock) is closed. The timer 204 may, for example, be a counter that is incremented periodically, or each time the state signal 111 is transmitted. According to an optional feature, the exemplary control circuit 110 stops transmitting the state signal 111, when the timer 204 indicates that a predetermined period of time has elapsed after the door 140 (or lock) is closed. An automatically controlled switch 208 may be provided for this purpose.

Other conventional elements that are known to be associated with any conventional processor system (e.g., a system clock, etc.) are understood by those skilled in the art to be included in the control circuit 110, but are not described herein, for brevity.

Figure 3:
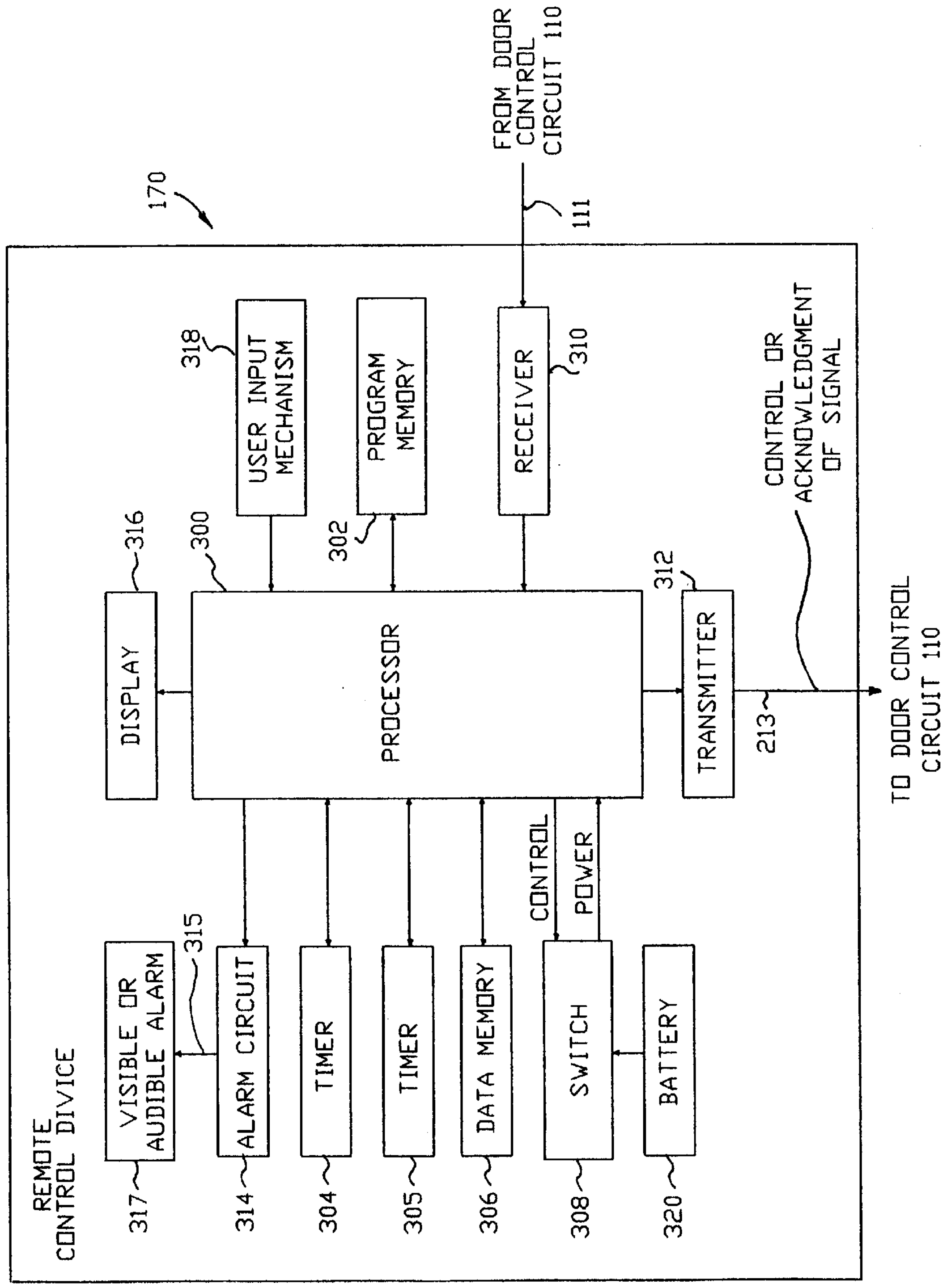
FIG. 3 is a block diagram of the remote control device shown in FIG. 1.

FIG. 3 is a block diagram of an exemplary remote control device 170 according to the invention. The remote control device 170 is operated by a processor 300, which may be a conventional microprocessor or microcontroller. The device 170 has a program memory 302 for storing program instructions and constant data values. The program memory 302 may be any conventional non-volatile memory device, such as programmable read only memory (PROM) or the like.

The remote control device 170 includes a receiver 310 that receives the state signal 111 while the remote control device 170 is proximate to the control circuit 110. A memory 306 stores the most recently received state signal 111. Memory 306 may be, for example, a random access memory (RAM) device, a register memory, or the like. The remote control device 170 has a display 316 that displays the value of the stored state signal. The display may be a light emitting diode (LED) display, a liquid crystal display (LCD) or the like.

An input mechanism 318 is operable by a user. The input mechanism allows the user to initiate a door opening or closing event, as in conventional remote control devices. Additional input mechanisms allow the user to enable/disable the additional functions described below. The input mechanism may include buttons, sliders, dials, toggles or the like. The display 316 may also display the value of the stored state signal 111 when the input mechanism 318 is actuated by the user.

An alarm circuit 314 generates an alarm signal 315, if the state signal 111 is not being received, and the stored state signal in memory 306 indicates that the door (or lock) 140 is opening or open.

The remote control device further comprises an alarm device 317 that provides a visible or audible alarm while the alarm signal 315 is generated. The alarm circuit 314 also generates the alarm signal 315 if the state signal 111 is received, and a magnitude of the state signal is less than a threshold value.

The remote control device 170 may include a transmitter 312 that transmits an acknowledgment signal 213 when the receiver 310 receives the state signal 111.

The remote control device 170 may include a switch 308 that automatically turns off the remote control device 170 when the state signal 111 indicates that the door (or lock) is closed.

The remote control device 170 may include a timer 304 that is started when the door 140 (or lock) is closed. The switch 308 turns off the remote control device 170, when the timer 304 indicates that a predetermined period of time has elapsed after the timer is started.

Alternately, the timer 304 may be started when the state signal 111 changes, and the switch 308 turns off the remote control device 170 when the timer 308 indicates that the state signal 111 remains unchanged for a predetermined period of time after the timer is started. This option conserves power when, for example, the user wants to keep the door (or lock) 140 open for an extended period of time.

Alternately, in a system which allows the alarm signal 315 to be turned off manually, the timer 304 may be used to terminate the alarm signal automatically after either: (1) a predetermined period of time elapses, or (2) the alarm signal is turned off manually, whichever occurs first.

One of ordinary skill in the art recognizes that a plurality of timers 304, 305 may be included, and each of the above automatic timer features may included in a single system.

The switch 308 is capable of being actuated manually by the user, to turn the remote control device back on after the remote control device is turned off.

Other conventional elements (that are known to be associated with any conventional processor system) are understood by those skilled in the art to be included in the remote control device 170, but are not described herein, for brevity.

Figure 4:
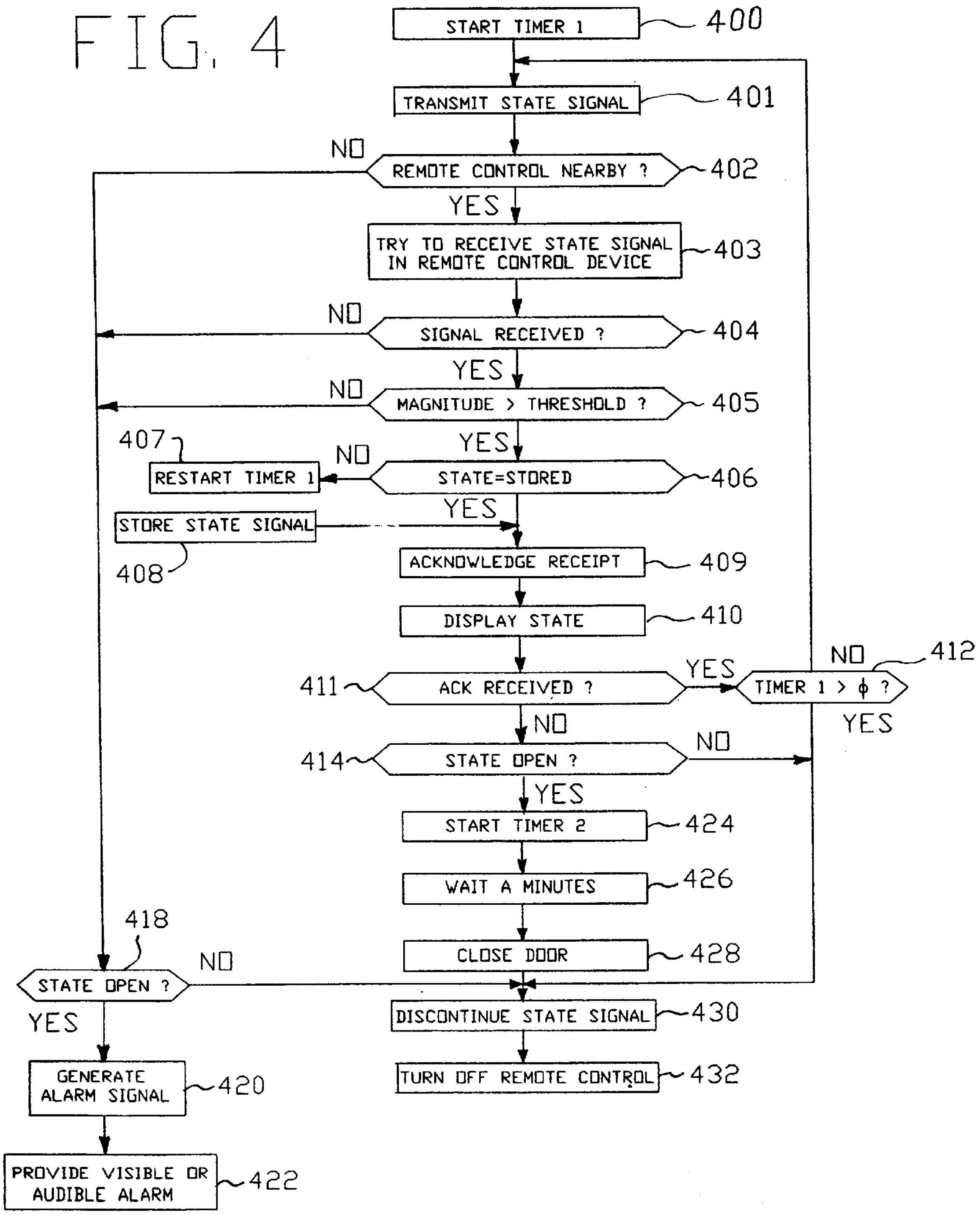
FIG. 4 is a flow chart diagram of an exemplary method of using the remote control system shown in FIG. 1.

FIG. 4 is a flow chart diagram of the operation of the system.

At step 400 a first timer (timer-1) 304 is started.

At step 401, the control circuit 110 transmits the state signal 111. If the remote control device 170 is nearby (step 402), then the receiver 310 of the remote control device tries to pick up the signal. If a signal 111 is received (step 404), then step 405 is executed.

At step 405, if the amplitude of the received signal is greater than a predetermined threshold value, then step 406 is executed.

If the remote control is not nearby (at step 402), or no signal is received (at step 404), or if the magnitude of the received signal is less than the threshold value (at step 405), then step 418 is executed. The magnitude of the received signal is below the threshold when, for example, the remote control device 170 is too far from the control circuit 110 to receive a clear signal. Step 418 corresponds to a situation in which the driver has now driven away.

At step 418, if the door (or lock) is open or opening—corresponding to a situation in which the driver has left with the door still open—then at step 420, the alarm signal is generated. At step 422, a visible or audible alarm is provided by alarm 317. If the state of the signal 111 is closed or closing (the driver has remembered to close the door), then control transfers to step 430. At step 430, the state signal 111 is discontinued, and at step 432 the remote control automatically shuts itself off.

At step 405, if the magnitude of the state signal 111 is greater than the predetermined threshold, then step 406 is executed.

At step 406, if the value of the state signal 111 matches the stored state, then control passes to step 409. If the value of the state signal 111 does not match the most recent value of the state signal stored in the data memory 306, then at step 407, timer-1 304 is restarted, and at step 408, the new value of the state signal 111 is stored in the data memory 306. Thus, timer-1 tracks how long the state signal has remained unchanged.

At step 409, the remote control device 170 transmits an acknowledgment signal 213 when the state signal has been received and the amplitude of the state signal is above the threshold. This is the acknowledgment signal 213 described above with respect to the control circuit 110.

At step 410, the remote control device 170 may display the value of the state signal 111 on the optional display 316.

At step 411, if the control circuit 110 receives the acknowledgment signal 213, then step 412 is executed. If, at step 411, the acknowledgment signal 213 is not received by the control circuit 110, then step 414 is executed.

At step 412, if timer-1 has a value of less than a threshold $\phi$ (the state signal has changed recently), then control returns to step 401, and the main loop is repeated. If timer-1 has a value of less than a threshold $\phi$ (indicating that the state signal has not changed for a period $\phi$), then step 430 is executed; the state signal is discontinued, and at step 432, the remote control is automatically turned off. This feature may be used to conserve power.

At step 414, if the state signal indicates that the door is closed, then step 430 is executed. If the state signal indicates that the door is opened, then a second timer (timer-2) 305 is started at step 424. Once timer-2 305 is started, and a period Δ passes (step 426), the door closing signal is sent by the control circuit 110 to the door closer 130. At step 428 the door is closed.

At step 430, the control circuit discontinues the state signal 430, and at step 432, the remote control device 170 shuts off automatically.

Figure 5:
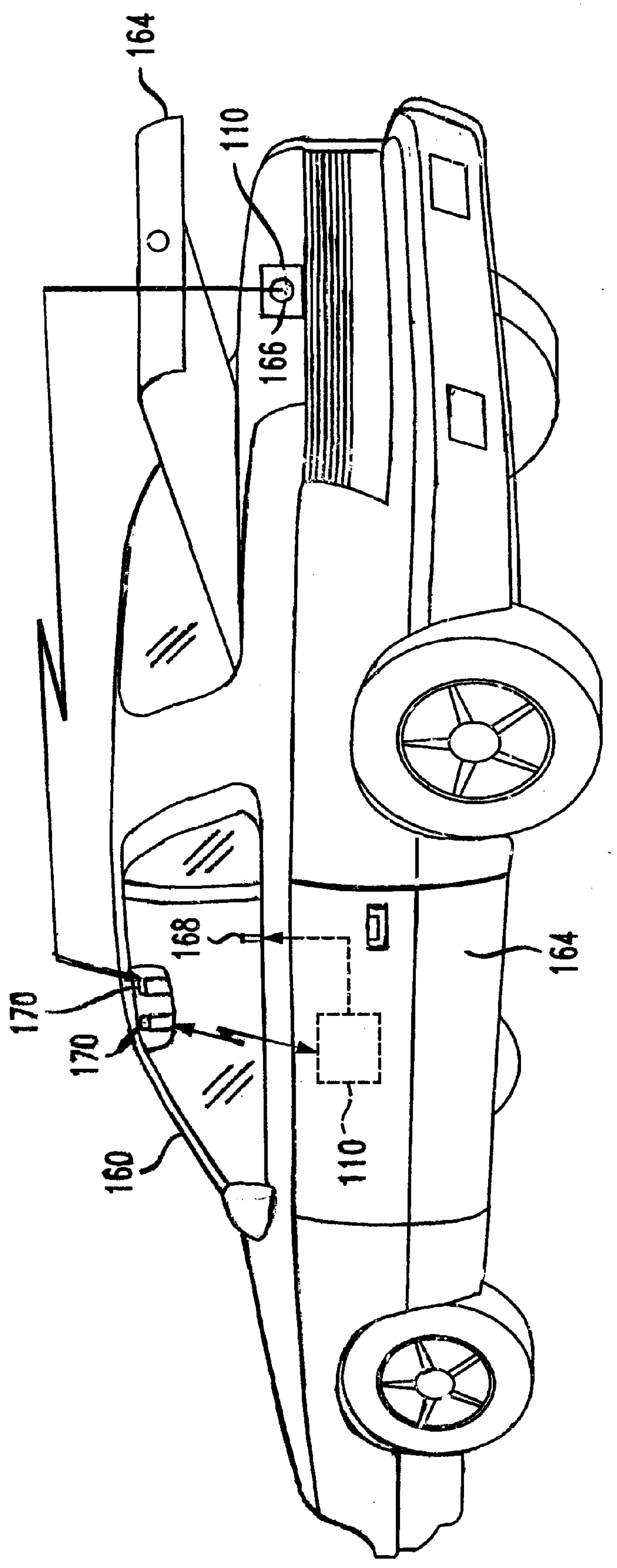
FIG. 5 is a diagram of a second exemplary remote control system according to the invention, in a car door locking system and a trunk locking system.

FIG. 5 shows a second exemplary use for the control circuit 110 and remote control device 170. The control circuit 110 may be used to control operation of a power lock system 168 for a car, or a trunk locking system 166. The operation of the devices would be similar to that described above.

Figure 6:
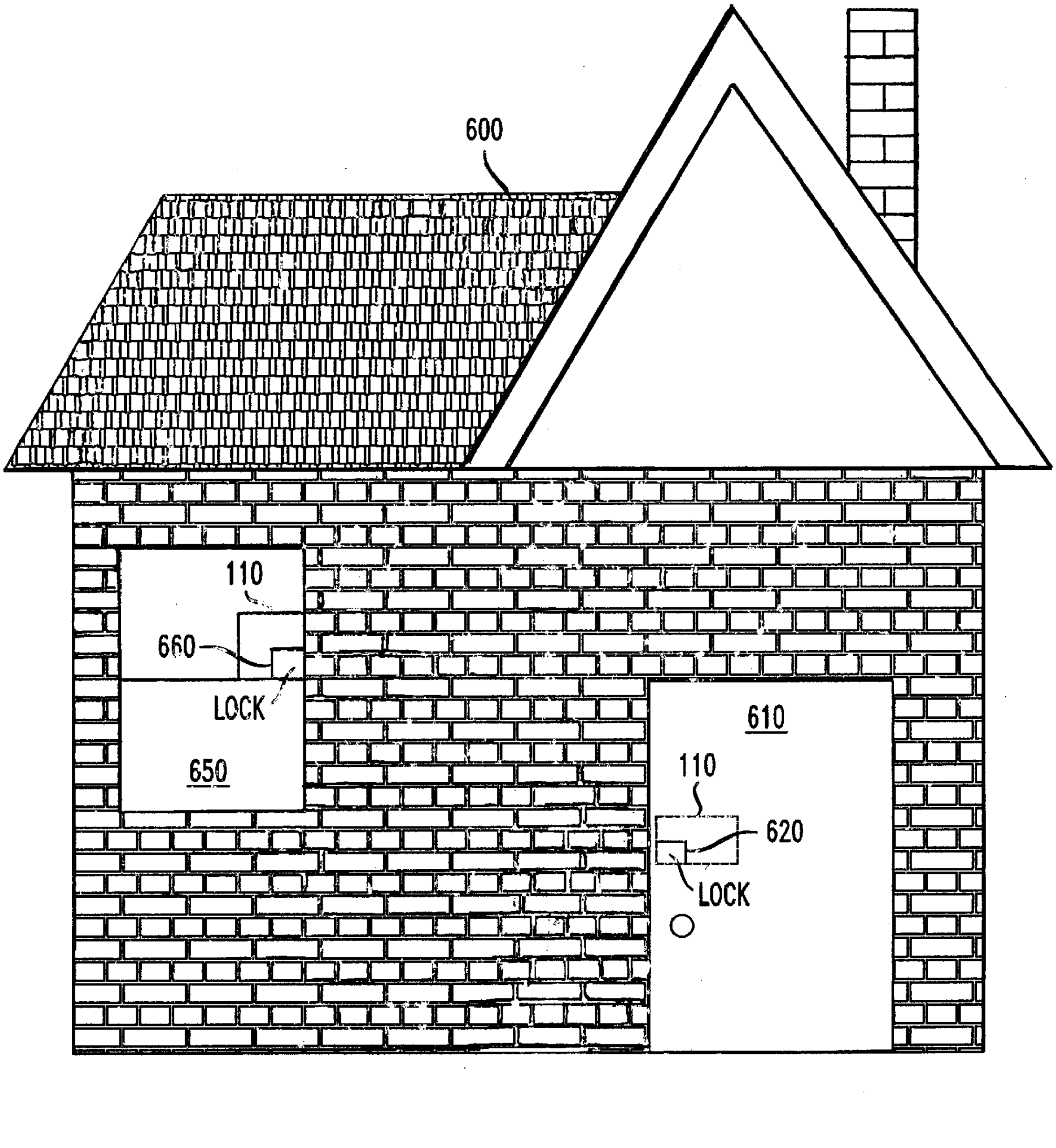
FIG. 6 is a diagram of a third exemplary remote control system according to the invention in an building door locking system.

FIG. 6 shows a building, in which the control circuit 110 and remote control device 170 (FIG. 3) are used to monitor and control a deadbolt 620 of a door 610, or a lock 660 on a window.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. Remote control apparatus comprising:

a control circuit capable of transmitting a state signal that indicates whether a door or lock is opening, open, closing or closed; and a remote control device that includes:

a receiver that receives the state signal while the remote control device is proximate to the control circuit, a memory for storing the received state signal, and an alarm circuit that generates an alarm signal, if the state signal is not being received, and the stored state signal indicates that the door or lock is opening or open.

2. Remote control apparatus according to claim 1, wherein the alarm circuit generates the alarm signal if the state signal is received and a magnitude of the state signal is less than a threshold value.

3. Remote control apparatus according to claim 1, wherein the remote control device further comprises an alarm device that provides a visible or audible alarm while the alarm signal is generated.

4. Remote control apparatus according to claim 1, wherein the remote control device further comprises a display that displays the value of the stored state signal.

5. Remote control apparatus according to claim 1, wherein the remote control device further comprises:

an input mechanism that is operable by a user, and a display that displays the value of the stored state signal when the input mechanism is operated by the user.

6. Remote control apparatus according to claim 1, wherein:

the remote control device further comprises a transmitter that transmits an acknowledgment signal when the receiver receives the state signal; and the control circuit includes:

a memory that stores the value of the state signal, and a receiver, wherein the control circuit generates and transmits a closing signal to a door or lock closer, if the receiver of the control circuit is not receiving the acknowledgment signal and the state signal indicates that the door or lock is open.

7. Remote control apparatus according to claim 1, wherein the control circuit controls a garage door opening and closing system.

8. Remote control apparatus according to claim 1, wherein the control circuit controls a car door locking system or a car trunk locking system.

9. Remote control apparatus according to claim 1, wherein the control circuit controls a locking mechanism for a door or lock of a building.

10. Remote control apparatus according to claim 1, further comprising a door or lock closer that closes the door or lock under control of the control circuit.

11. Remote control apparatus according to claim 1, further comprising a timer that is started when the door or lock is closed, wherein the control circuit stops transmitting the state signal, when the timer indicates that a predetermined period of time has elapsed after the door or lock is closed.

12. Remote control apparatus according to claim 1, wherein the remote control device further includes a switch that turns off the remote control device when the state signal indicates that the door or lock is closed.

13. Remote control apparatus according to claim 1, wherein the remote control device further includes:

a timer that is started when the door or lock is closed, and a switch that turns off the remote control device, when the timer indicates that a predetermined period of time has elapsed after the timer is started.

14. Remote control apparatus according to claim 1, wherein the remote control device further includes:

a timer that is started when the state signal changes, and a switch that turns off the remote control device when the timer indicates that the state signal remains unchanged for a predetermined period of time after the timer is started.

15. Remote control apparatus according to claim 14, wherein the switch is capable of being actuated manually, to turn the remote control device back on after the remote control device is turned off.

16. Remote control apparatus according to claim 1, wherein the alarm signal can be turned off manually, and the alarm signal terminates after: a predetermined period of time elapses, or the alarm signal is turned off manually, whichever occurs first.

17. Remote control apparatus comprising:

door or lock control means for transmitting a state signal indicating whether a door or lock is opening, open, closing or closed; and a remote control device that includes:

receiving means for receiving the state signal while the remote control device is proximate to the door or lock control means, storage means for storing the received state signal, and alarm means for generating an alarm signal, if the state signal is not being received, and the stored state signal indicates that the door or lock is opening or open.

18. Remote control apparatus according to claim 17, wherein the alarm means generates the alarm signal if the state signal is received and a magnitude of the state signal is less than a threshold value.

19. Remote control apparatus according to claim 17, wherein the remote control device further comprises alarm indicating means for providing a visible or audible indication while the alarm signal is generated.

20. Remote control apparatus according to claim 17, wherein the remote control device further comprises display means for displaying the value of the stored state signal.

21. Remote control apparatus according to claim 17, wherein the remote control device further comprises:

input means that is operable by a user, and a display means for displaying the value of the stored state signal when the input means is operated by the user.

22. Remote control apparatus according to claim 17, wherein:

the remote control device further comprises transmitter means for transmitting an acknowledgment signal when the receiving means receives the state signal; and the door or lock control means includes:

storage means for storing the value of the state signal, and means for receiving the acknowledgment signal, wherein the door or lock control means generates and transmits a closing signal to a door or lock closer, if the acknowledgment signal receiving means is not receiving the acknowledgment signal and the state signal indicates that the door or lock is open.

23. Remote control apparatus according to claim 17, wherein the door or lock control means controls a garage door opening and closing system.

24. Remote control apparatus according to claim 17, wherein the door or lock control means controls a car door locking system or a car trunk locking system.

25. Remote control apparatus according to claim 17, wherein the door or lock control means controls a locking mechanism for a door of a building.

26. Remote control apparatus according to claim 17, further comprising a door or lock closing means for closing the door or lock under control of the control circuit.

27. A method for controlling a door or lock, comprising the steps of:

(a) transmitting a state signal indicating whether a door or lock is opening, open, closing or closed;

(b) receiving the state signal in a remote control device, while the remote control device is proximate to the door or lock;

(c) storing the received state signal in the remote control device, and (d) generating an alarm signal, if the state signal is not being received by the remote control device, and the stored state signal indicates that the door or lock is opening or open.

28. The method according to claim 27, wherein step (d) includes generating the alarm signal if the state signal is received and a magnitude of the state signal is less than a threshold value.

29. The method according to claim 27, wherein the method further comprises the step of providing a visible or audible alarm while the alarm signal is generated.

30. The method according to claim 27, wherein the method further comprises the step of displaying the value of the stored state signal.

31. The method according to claim 27, wherein the method further comprises the steps of:

operating an input mechanism located on the remote control device, and displaying the value of the stored state signal when the input mechanism is operated.

32. The method according to claim 27 further comprising the steps of:

transmitting an acknowledgment signal from the remote control device when the state signal is received; and generating and transmitting a closing signal to a door or lock closer, if the acknowledgment signal is not being transmitted, and the state signal indicates that the door or lock is open.

33. The method according to claim 32, further comprising the step of discontinuing the transmitting of the state signal, when a predetermined period of time has elapsed after the door or lock is closed.

34. The method according to claim 32, further comprising the step of automatically turning off the remote control device when the state signal indicates that the door or lock is closed.

35. The method according to claim 32, further comprising the step of automatically turning off the remote control device, when a predetermined period of time has elapsed after the door or lock is opened.

36. The method according to claim 27, further comprising the step of automatically turning off the remote control device when the state signal remains unchanged for a predetermined period of time.

* * * * *

UNITED STATES PATENT AND TRADEMARK OFFICE

CERTIFICATE OF CORRECTION

PATENT NO. : 6,388,559 B1
DATED : May 14, 2002
INVENTOR(S) : Alan Ian Cohen

It is certified that error appears in the above-identified patent and that said Letters Patent is hereby corrected as shown below:

Column 5,
Claim 1, line 2, the phrase "capable of transmitting" should be replaced with the phrase -- that transmits --.

Columns 5-7,
Claims 1-26, on the first line of each claim the term "apparatus" should be changed to -- system --.

Signed and Sealed this

Twenty-fourth Day of December, 2002

JAMES E. ROGAN
*Director of the United States Patent and Trademark Office*